(12) United States Patent
Abe et al.

(10) Patent No.: US 9,179,466 B2
(45) Date of Patent: Nov. 3, 2015

(54) BASE STATION APPARATUS, MOBILE TERMINAL APPARATUS AND COMMUNICATION CONTROL METHOD

(75) Inventors: Tetsushi Abe, Tokyo (JP); Satoshi Nagata, Tokyo (JP); Nobuhiko Miki, Tokyo (JP); Sangiamwong Jaturong, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 13/261,460

(22) PCT Filed: Apr. 5, 2011

(86) PCT No.: PCT/JP2011/058609
§ 371 (c)(1),
(2), (4) Date: Dec. 19, 2012

(87) PCT Pub. No.: WO2011/126007
PCT Pub. Date: Oct. 13, 2011

(65) Prior Publication Data
US 2013/0084879 A1    Apr. 4, 2013

(30) Foreign Application Priority Data
Apr. 5, 2010    (JP) .................................. 2010-087389

(51) Int. Cl.
*H04W 72/08*    (2009.01)
*H04W 16/16*    (2009.01)
*H04W 72/12*    (2009.01)

(52) U.S. Cl.
CPC ............ *H04W 72/082* (2013.01); *H04W 16/16* (2013.01); *H04W 72/1205* (2013.01)

(58) Field of Classification Search
CPC .......... H04W 72/082; H04W 72/1205; H04W 16/14; H04W 72/04; H04W 72/0446; H04W 16/16

USPC ......... 370/315, 316, 322, 326, 328, 329, 330, 370/332, 333, 334, 335, 336, 337, 338, 341, 370/342, 343, 344, 376, 436, 437, 441, 370/458; 455/422.1, 434, 443, 444, 447, 455/448, 449, 450, 451, 452.1, 452.2, 454, 455/463, 464, 509
See application file for complete search history.

(56) References Cited

U.S. PATENT DOCUMENTS

2005/0254555 A1* 11/2005 Teague .......................... 375/136
2010/0080166 A1*  4/2010 Palanki et al. ................ 370/315
2011/0170496 A1*  7/2011 Fong et al. .................... 370/329

OTHER PUBLICATIONS

International Search Report w/translation issued from PCT/JP2011/058609 mailed Jun. 21, 2011 (2 pages).

(Continued)

*Primary Examiner* — Dinh P Nguyen
(74) *Attorney, Agent, or Firm* — Osha Liang LLP

(57) ABSTRACT

To provide a base station apparatus, mobile terminal apparatus and communication control method for enabling control adapted to interference inside a Heterogeneous network to be performed to support the next-generation mobile communication system, a base station apparatus (20) shares at least a part of the frequency band with another base station apparatus (40) that covers a macro-cell, covers a pico-cell (C1), is capable of transmitting a downlink transmission frame at transmission timing different from the another base station apparatus (40), and is configured to set resources, in which the downlink transmission frame undergoes interference from another downlink transmission frame including a blank period transmitted from the another base station apparatus (40), as blank resources, and assign user data to the downlink transmission frame while avoiding the blank resources.

4 Claims, 11 Drawing Sheets

(56) References Cited

OTHER PUBLICATIONS

Motorola; "Reliable Downlink Control for Heterogeneous Networks"; 3GPP TSG RAN-1 #58bis, R1-093971; Oct. 16, 2009 (7 pages).

3GPP TR 25.912 V7.1.0; "3rd Generation Partnership Project; Technical Specification Group Radio Access Network; Feasibility study for evolved Universal Terrestrial Radio Access (UTRA) and Universal Terrestrial Radio Access Network (UTRAN) (Release 7)"; Sep. 2006 (57 pages).

Notification of Reasons for Rejection in corresponding Japanese application No. 2010-087389 dated May 14, 2013 (7 pages).

CATT; "Considerations on Interference Coordination in Het-Net"; 3GPP TSG RAN WG1 meeting #60, R1-100902; San Francisco, USA, Feb. 22-26, 2010 (6 pages).

NTT DOCOMO; "Performance Evaluations of Heterogeneous Networks"; 3GPP TSG RAN WG1 Meeting #60 R1-101226; San Francisco, USA; Feb. 22-26, 2010 (22 pages).

Decision to Grant a Patent issued in Japanese Patent Application No. 2010-087389, mailing date Oct. 29, 2013, with English translation thereof (4 pages).

\* cited by examiner

BASE STATION APPARATUS, MOBILE TERMINAL APPARATUS AND COMMUNICATION CONTROL METHOD

TECHNICAL FIELD

The present invention relates to a base station apparatus, mobile terminal apparatus and communication control method in the next-generation mobile communication system.

BACKGROUND ART

In UMTS (Universal Mobile Telecommunications System) networks, for the purpose of improving spectral usage efficiency and further improving data rates, by adopting HSDPA (High Speed Downlink Packet Access) and HSUPA (High Speed Uplink Packet Access), it is performed exploiting maximum features of the system based on W-CDMA (Wideband Code Division Multiple Access). For the UMTS network, for the purpose of further increasing high-speed data rates, providing low delay and the like, Long Term Evolution (LTE) has been studied (Non-patent Literature 1). In LTE, as a multiplexing scheme, OFDMA (Orthogonal Frequency Division Multiple Access) different from W-CDMA is used in downlink, while SC-FDMA (Single Carrier Frequency Division Multiple Access) is used in uplink.

In the 3G system, a fixed band of 5 MHz is substantially used, and it is possible to achieve transmission rates of approximately maximum 2 Mbps in downlink. Meanwhile, in the LTE system, using variable bands ranging from 1.4 MHz to 20 MHz, it is possible to achieve transmission rates of maximum 300 Mbps in downlink and about 75 Mbps in uplink. Further, in the UMTS network, for the purpose of further increasing the wide-band and high speed, successor systems to LTE have been studied (for example, LTE Advanced (LTE-A)). In LTE-A (LTE Release 10), a Heterogeneous network configuration is studied in which importance is attached to a local area environment in addition to conventional cellular environments.

CITATION LIST

Non-Patent Literature

Non-Patent Literature 1: 3GPP, TR25.912 (V7.1.0), "Feasibility Study for Evolved UTRA and UTRAN", September 2006

SUMMARY OF THE INVENTION

Technical Problem

The present invention was made in view of such a respect, and it is an object of the invention to provide a base station apparatus, mobile terminal apparatus and communication control method for enabling control adapted to interference inside a Heterogeneous network to be performed to support the next-generation mobile communication system.

Solution to Problem

A base station apparatus of the invention is a base station apparatus which shares at least a part of a frequency band with another base station apparatus that covers a large-scale cell, covers a small-scale cell, and is capable of transmitting a downlink transmission frame at transmission timing different from the another base station apparatus, and is characterized by having a blank resource setting section configured to set resources, in which the downlink transmission frame undergoes interference from another downlink transmission frame including a blank period transmitted from the another base station apparatus, as blank resources, a user data assigning section configured to assign user data to the downlink transmission frame while avoiding the blank resources, and a transmission section configured to transmit the downlink transmission frame assigned the user data to a mobile terminal apparatus.

A base station apparatus of the invention is a base station apparatus which shares at least a part of a frequency band with another base station apparatus that covers a small-scale cell, covers a large-scale cell, and is capable of transmitting a downlink transmission frame at transmission timing different from the another base station apparatus, and is characterized by having a blank resource setting section configured to set resources, in which the downlink transmission frame interferes with a downlink control channel of another downlink transmission frame transmitted from the another base station apparatus, as blank resources, a user data assigning section configured to assign user data to the downlink transmission frame while avoiding the blank resources, and a transmission section configured to transmit the downlink transmission frame assigned the user data to a mobile terminal apparatus.

Technical Advantages of the Invention

According to the invention, interference is suppressed which is imposed on a downlink transmission frame transmitted from a base station apparatus of a small-scale cell by a downlink transmission frame transmitted from a base station apparatus of a large-scale cell. Thus, it is possible to cause the base station apparatus of the large-scale cell and the base station apparatus of the small-scale to perform control adapted to interference inside a Heterogeneous network having the large-scale cell and the small-scale cell.

DESCRIPTION OF EMBODIMENTS

Figure 1:
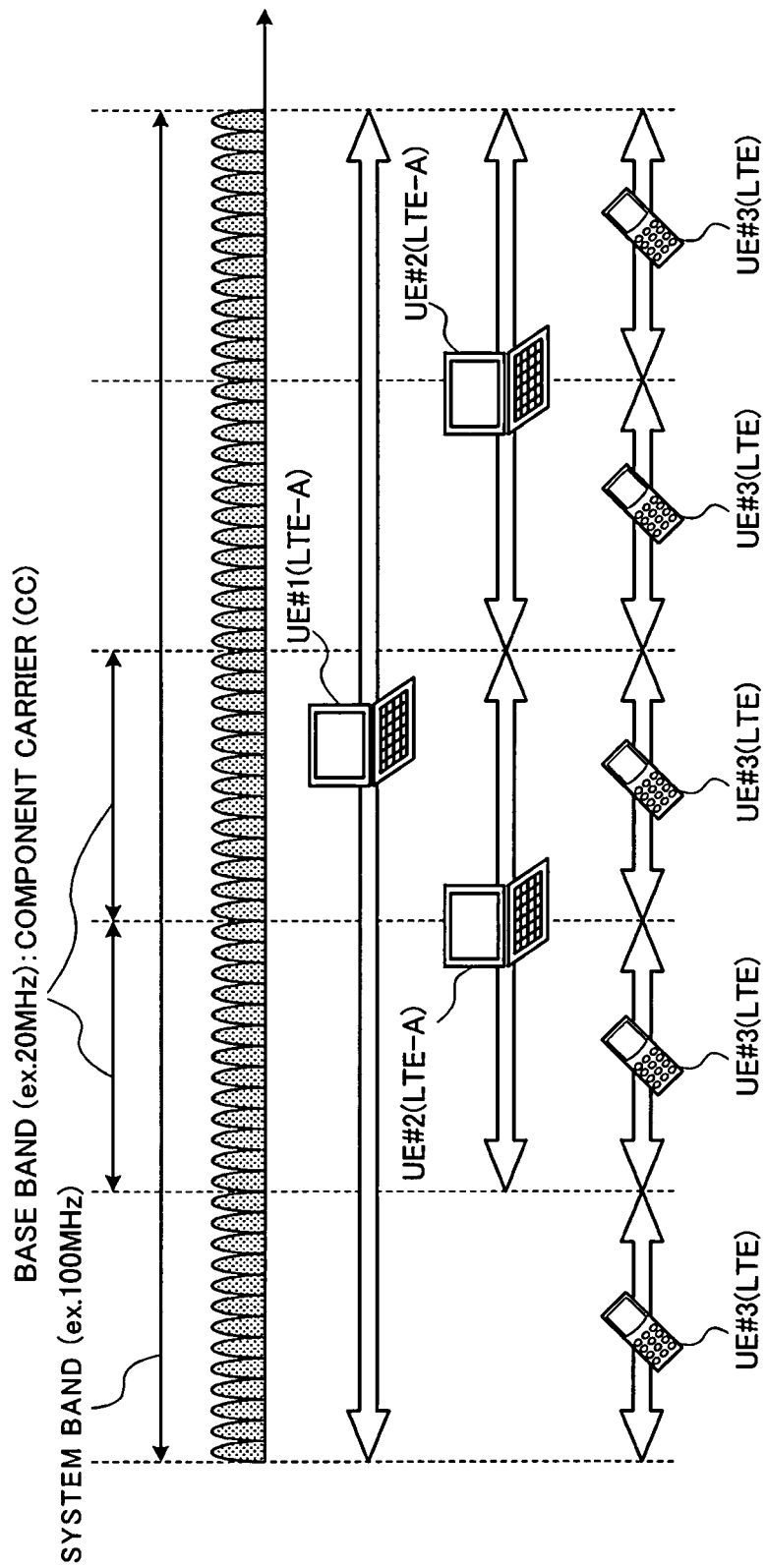
FIG. 1 is an explanatory view of a system band of an LTE system.

FIG. 1 is a diagram to explain a frequency usage state when mobile communications are performed in downlink. In addition, in the following descriptions, a base frequency block is described as a component carrier. The example as shown in FIG. 1 is of the frequency usage state in the case of coexistence of LTE-A systems that are first mobile communication systems having first relatively wide system bands comprised of a plurality of component carriers, and LTE systems that are second mobile communication systems having a second relatively narrow system band (herein, comprised of a single component carrier). In the LTE-A systems, for example, radio communications are performed with a variable system bandwidth of 100 MHz or less, and in the LTE systems, radio communications are performed with a variable system bandwidth of 20 MHz or less. The system band of the LTE-A system is at least one base frequency region (component carrier: CC) with a system band of the LTE system as a unit. Thus integrating a plurality of base frequency regions to broaden the band is referred to as carrier aggregation.

For example, in FIG. 1, the system band of the LTE-A system is a system band (20 MHz×5=100 MHz) containing bands of five component carriers where the system band (base band: 20 MHz) of the LTE system is one component carrier. In FIG. 1, a mobile terminal apparatus UE (User Equipment) #1 is a mobile terminal apparatus supporting the LTE-A system (also supporting the LTE system), and has the system band of 100 MHz, UE#2 is a mobile terminal apparatus supporting the LTE-A system (also supporting the LTE system), and has the system band of 40 MHz (20 MHz×2=40 MHz), and UE#3 is a mobile terminal apparatus supporting the LTE system (not supporting the LTE-A system), and has the system band of 20 MHz (base band).

Figure 2:
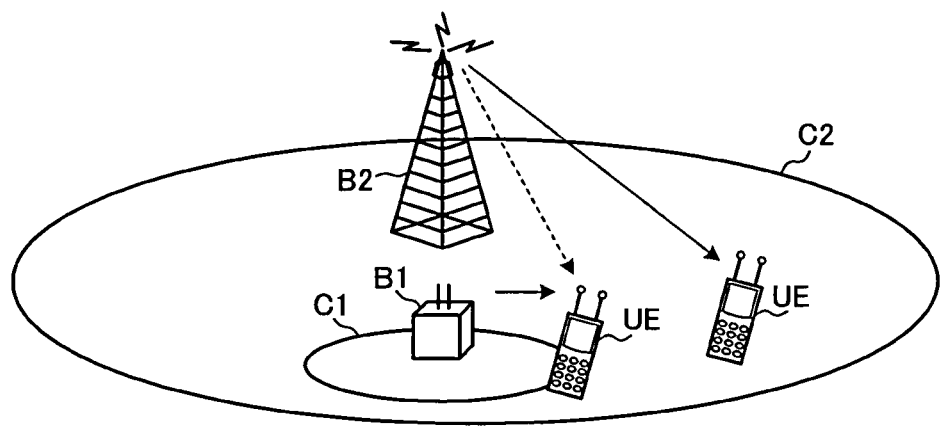
FIG. 2 is an explanatory view of the outline of a Heterogeneous network.

In addition, in the LTE-A system, a Heterogeneous network (hereinafter, referred to as HetNet) configuration is studied in which importance is attached to a local area environment. As shown in FIG. 2, the HetNet is a hierarchical network for overlaying various forms of cells of a pico-cell C1, femto-cell and the like (small-scale cells) in addition to a conventional macro-cell C2 (large-scale cell). In the HetNet, a base station apparatus B2 of the macro-cell C2 for covering a relatively large area is set for downlink transmission power higher than a base station apparatus B1 of the pico-cell C1 for covering a relatively narrow area.

Figure 3:
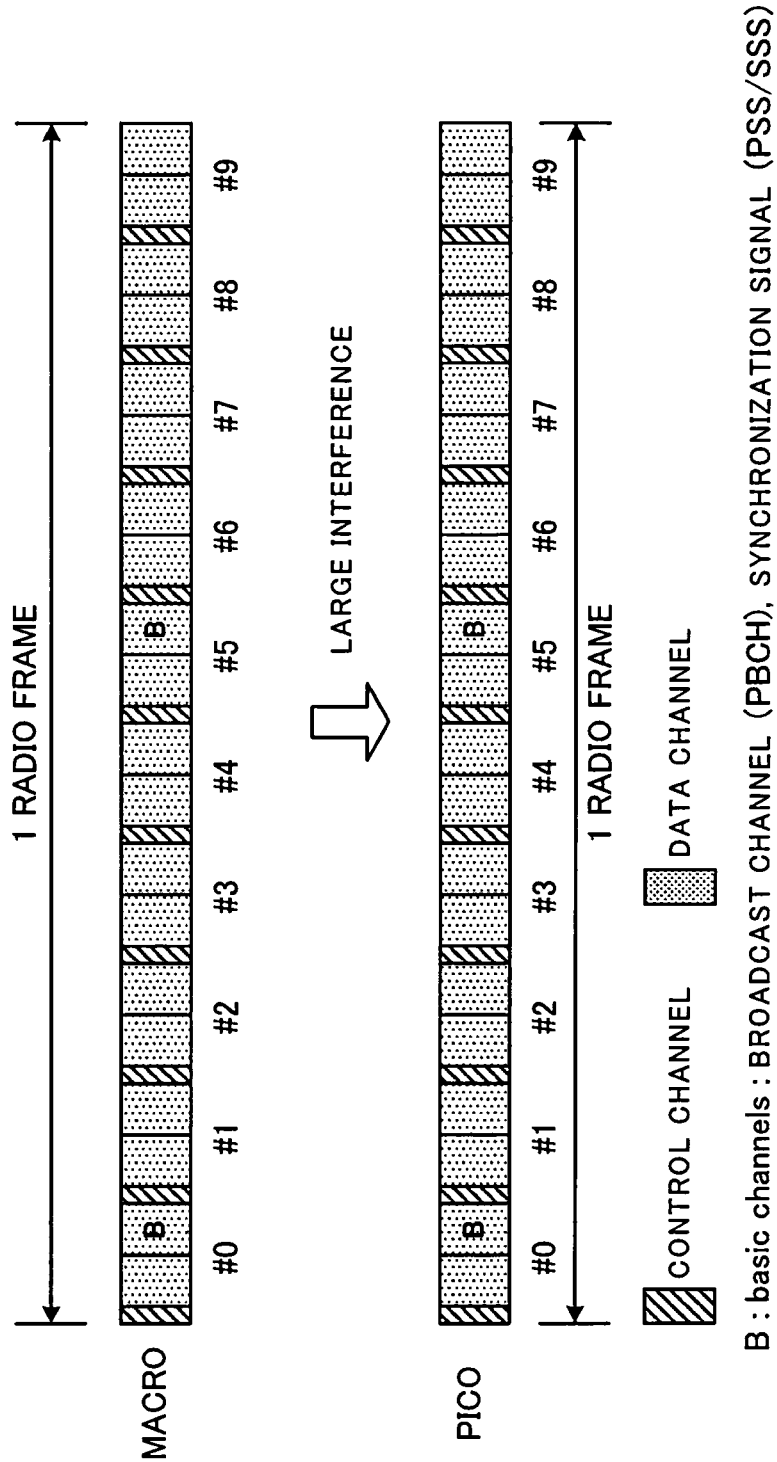
FIG. 3 is an explanatory view of interference of radio frames of a macro-cell and a pico-cell.

Accordingly, when the macro-cell C2 and the pico-cell C1 are operated with close frequency bands, as shown in FIG. 3, there is a problem that a radio frame from the base station apparatus B1 of the pico-cell C1 undergoes large interference from a radio frame from the base station apparatus B2 of the macro-cell C2. Therefore, in the pico-cell C1, coverage is narrowed by large interference from the macro-cell C2. Further, particularly a downlink control channel (PDCCH: Physical Downlink Control Channel) arranged at the beginning of a subframe is basically not retransmitted as distinct from a downlink data channel (PDSCH: Physical Downlink Shared Channel), and therefore, is given a significant effect by interference from the macro-cell C2. Furthermore, a broadcast channel (PBCH: Physical Broadcast Channel) shown by B in the subframe and cell-search synchronization signal (PSS: Primary Synchronization Signal, SSS: Secondary Synchronization Signal) are also not basically retransmitted, and therefore, are given a significant effect by interference from the macro-cell C2.

Figure 4:
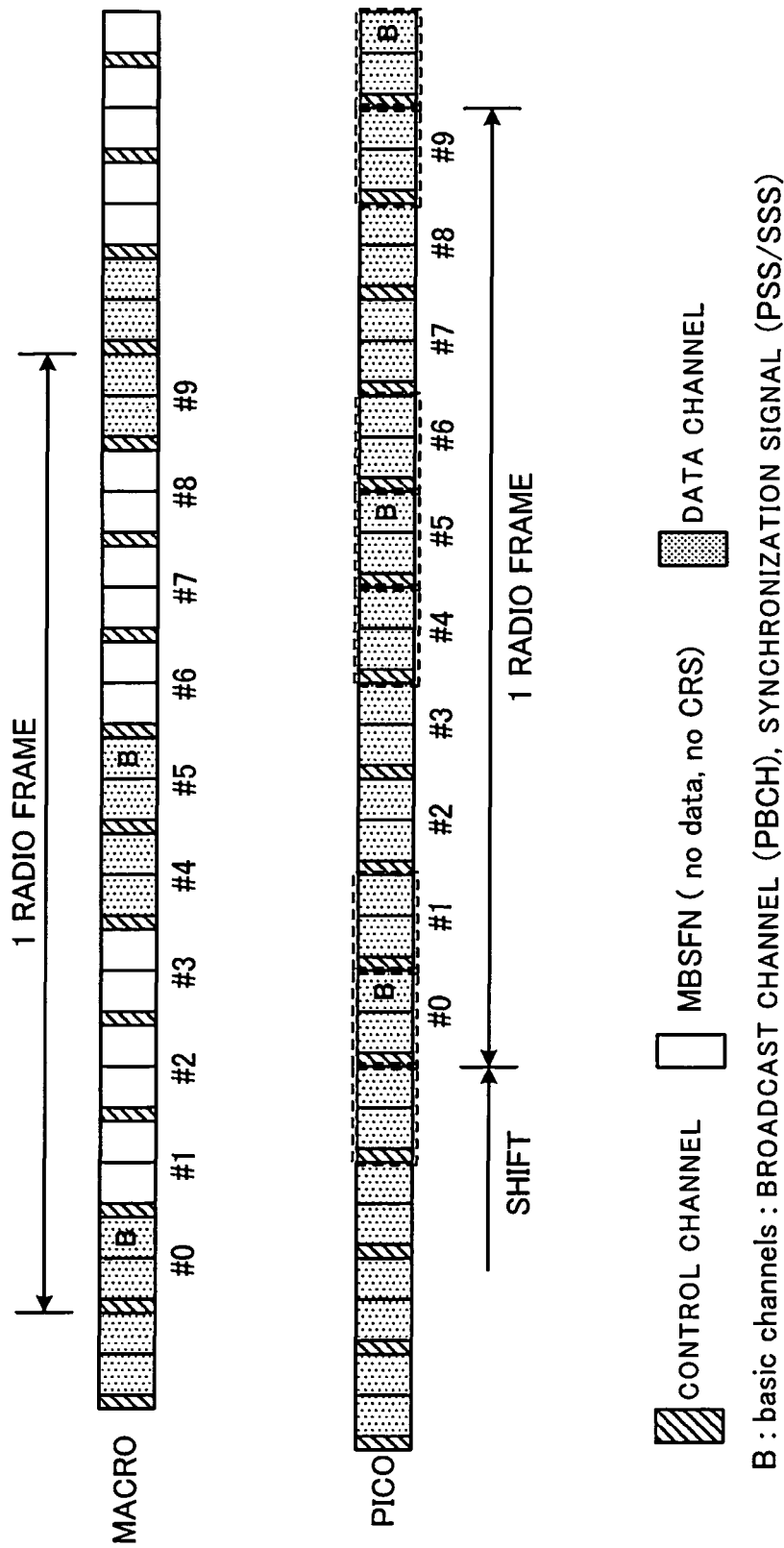
FIG. 4 is an explanatory view of an interference suppression method for radio frames of the micro-cell and the pico-cell.

To solve the problems, as shown in FIG. 4, considered is a method of using an MBSFN (Multimedia Broadcast multicast service Single Frequency Network) subframe and subframe shift. The MBSFN frame is specified in the LTE system, and is a subframe for enabling signals except a control channel to be a blank interval (blank period). According to this configuration, overlap of downlink control channels is canceled by radio frames of the macro-cell C2 and the pico-cell C1 being shifted in the time-axis direction. Further, the radio frame of the macro-cell C2 is partially provided with the blank periods by the MBSFN subframes, and suppresses interference to the downlink control channels, broadcast channels and synchronization signals of the subframes enclosed by dashed lines of the pico-cell C1. As a result, coverage of the downlink control channel, broadcast channel and synchronization signal of the pico-cell C1 is ensured. Further, interference is also reduced to downlink data channels of the subframes enclosed by dashed lines of the pico-cell C1 by the blank periods of the radio frame of the macro-cell C2, and improvements in the data rate are expected.

However, in the aforementioned method, although interference to the downlink control channels is suppressed in the subframes of the pico-cell C1 enclosed by dashed lines, there is a problem that a part of user data undergoes interference from the radio frame of the macro-cell C2. Further, control channels of subframes that are not enclosed by dashed lines of the pico-cell C1 are affected by interference of the radio frame of the macro-cell C2.

Therefore, to solve the problem, the inventors of the invention arrived at the invention. In other words, it is the gist of the invention that a base station apparatus of a pico-cell assigns user data to a subframe while avoiding resources that undergo interference from a macro-cell, and that a base station apparatus of the macro-cell assigns user data to a subframe while avoiding resources that interfere with a control channel of the pico-cell.

Figure 5:
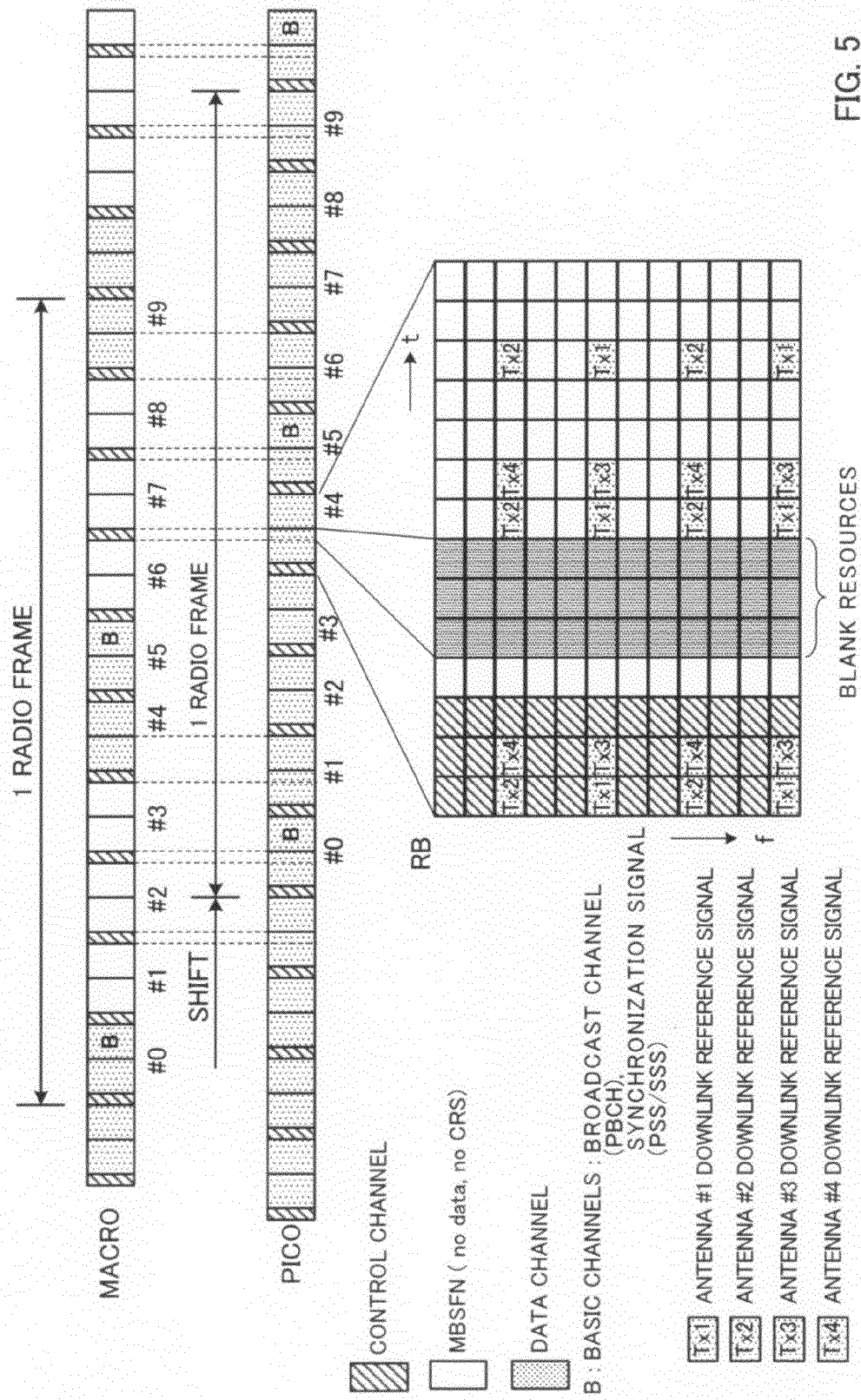
FIG. 5 is an explanatory view showing an example of transmission control processing in a base station apparatus of the pico-cell.

An Embodiment of the invention will specifically be described below with reference to accompanying drawings. Referring to FIG. 5, described is suppression of interference to a downlink radio frame of the pico-cell by transmission control in a base station apparatus of the pico-cell. FIG. 5 is an explanatory view showing an example of transmission control processing in the base station apparatus of the pico-cell according to this Embodiment of the invention.

As shown in FIG. 5, a downlink radio frame of the macro-cell C2 is comprised of 10 subframes of subframes #0 to #9, and a control channel (PDCCH) is multiplexed into OFDM symbols on the beginning side of each subframe. Further, the downlink radio frame of the macro-cell C2 has the above-mentioned MBSFN subframes, and blank periods are set except control channels of subframes except subframes #0, #4, #5 and #9. The broadcast channel (PBCH) and synchronization signals (PSS, SSS) for cell search are multiplexed into subframes #0 to #5.

Meanwhile, a downlink radio frame of the pico-cell C1 has the same radio frame configuration as the downlink radio frame of the macro-cell C2, but the subframe is not set for the blank period. Further, the downlink radio frame of the pico-cell C1 is subframe-shifted in the time-axis direction relatively to the radio frame of the macro-cell C2. By this means, a part of control channels, broadcast channels, synchronization signals and the like in the downlink radio frame of the pico-cell C1 are coincident with the blank periods of the downlink radio frame of the macro-cell C2, and interference from the macro-cell C2 is suppressed. In the downlink radio frame of the pico-cell C1, subframes with interference to the control channel and the like suppressed are used.

As described above, the blank periods of the downlink radio frame of the macro-cell C2 are set except the downlink control channels. Further, the subframe of the pico-cell C1 is shifted in the time-axis direction with respect to the MBSFN subframe of the macro-cell C2. Therefore, in the subframe of the pico-cell C1, although interference to the control channel is suppressed by the blank period of the MBSFN subframe of the macro-cell C2, the data channel partially undergoes interference. For example, interference to the control channel is suppressed in the subframe #6 of the pico-cell C1, but the subframe #6 undergoes interference from the subframe #9 of the macro-cell C2. Further, the subframes #4 and #5 of the pico-cell C1 undergo interference respectively by downlink control channels of the subframes #7 and #8 of the macro-cell C2. In this Embodiment, the base station apparatus 20 (see FIG. 7) of the pico-cell C1 transmits the downlink radio frame to a mobile terminal apparatus 10 while avoiding resources that undergo interference from the downlink radio frame of the macro-cell C2.

In other words, in the downlink radio frame of the pico-cell C1, resources that undergo interference from the downlink radio frame of the macro-cell C2 are set as blank resources, and user data is assigned except the blank resources. The user data is assigned to each mobile terminal apparatus on a resource block basis in each subframe by a scheduler. One resource block is comprised of 12 contiguous subcarriers, and is configured with a resource element as a minimum unit. In the resource block, first 3 symbols are used for the downlink control channel, and downlink reference signals for each transmission antenna are arranged in a part thereof. Accordingly, in the resource block of the pico-cell C1, the user data is assigned to resource elements that avoid the downlink control channel, downlink reference signals and blank resources. For example, in the subframe #4 of the pico-cell C1, the 5th to 7th symbols undergo interference by the control channel of the subframe #7 of the macro-cell C2. Therefore, in the subframe #4 of the pico-cell C1, the user data is assigned to resource elements in the regions that avoid the 1st to 3rd symbols, 5th to 7th symbols, downlink reference signals, and the like.

The blank resources of the downlink radio frame of the pico-cell C1 are set based on the shift amount of transmission timing of downlink radio frames of the pico-cell C1 and the macro-cell C2, and a set position of the blank period of the downlink radio frame of the macro-cell C2. The shift amount indicates a shift of the downlink control channel in each subframe of the pico-cell C1 and the macro-cell C2. Therefore, in the subframe of the pico-cell C1, resources undergoing interference from the downlink control channel of the macro-cell C2 are specified by the shift amount. The set position of the blank period enables a subframe with no interference to the control channel of the pico-cell C1 to be specified by combining with the shift amount. In this case, in the subframe of the pico-cell C1, as in the subframe #6, in the subframe with no interference to the control channel, resources undergoing interference from the downlink control channel and the downlink data channel of the macro-cell C2 are specified. Thus, resources undergoing interference from the downlink radio frame of the macro-cell C2 are specified, and the resources are set as blank resources.

In addition, the blank resources set by the base station apparatus of the pico-cell are resources set on the premise of undergoing interference from the radio frame of the micro-cell C2. In this case, the blank resources may be resources to which any data is not assigned at all, or may be defined as resources to which unnecessary data is assigned. Further, the blank resources may be defined as resources transmitted with transmission power of predetermined transmission power or less.

In addition, the shift amount may be configured so that the base station apparatus 20 of the pico-cell C1 (see FIG. 7) receives signaling of the base station apparatus 40 of the macro-cell, alternatively, the reverse may be possible. Further, the base station apparatus 40 of the macro-cell notifies the base station apparatus 20 of the pico-cell of the set position of the blank period. In addition, in the case of suppressing only interference by the control channel of the macro-cell C2, the base station apparatus 40 of the macro-cell does not need to notify the base station apparatus 20 of the pico-cell of the set position of the blank period.

Further, the mobile terminal apparatus 10 of the pico-cell C1 is notified of the allocation position of the blank resources of the downlink radio frame of the pico-cell C1 as blank resource information. By this configuration, the mobile terminal apparatus 10 of the pico-cell C1 is capable of demodulating the user data while avoiding the blank resources of the downlink radio frame. In this case, the blank resource information may be notified to the mobile terminal apparatus 10 for each subframe. Further, when the blank resource information is stored in the mobile terminal apparatus 10 in association with the shift amount of transmission timing of downlink radio frames of the pico-cell C1 and the macro-cell C2, notification to the mobile terminal apparatus 10 is not necessary. This is because the mobile terminal apparatus 10 is capable of estimating the allocation position of the blank resources from the shift amount. By this configuration, the base station apparatus 20 of the pico-cell C1 notifies the mobile terminal apparatus 10 of only the shift amount, and it is possible to reduce overhead.

Figure 6:
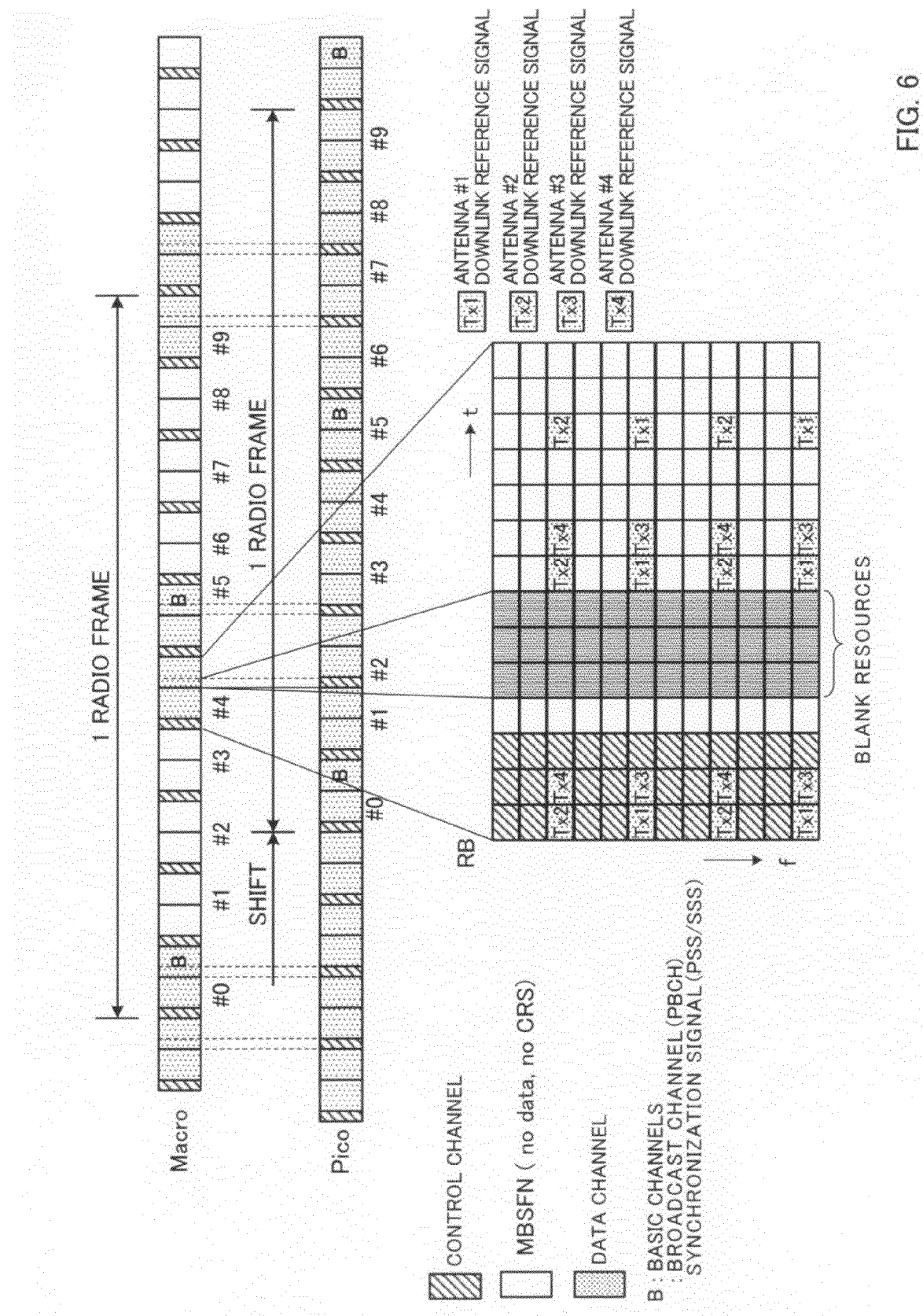
FIG. 6 is an explanatory view of transmission control processing in a base station apparatus of the macro-cell.

Described next is suppression of interference to downlink control channels of a downlink radio frame of the pico-cell by transmission control in the base station apparatus of the macro-cell. FIG. 6 is an explanatory view showing an example of transmission control processing in the base station apparatus of the macro-cell according to this Embodiment of the invention.

In the above-mentioned transmission control in the pico-cell C1, interference is suppressed only to a part of control channels by the blank periods of the downlink radio frame of the macro-cell C2. Therefore, in the pico-cell C1, used is a part of subframes with interference to control channels suppressed. In this Embodiment, the base station apparatus 40 of the macro-cell C2 transmits a downlink radio frame to a mobile terminal apparatus 30 while avoiding resources that interfere with control channels of a downlink radio frame of the pico-cell C1.

In other words, in the downlink radio frame of the macro-cell C2, resources that interfere with downlink control channels of the downlink radio frame of the pico-cell C1 are set as blank resources, and user data is assigned to resources except the blank resources. Accordingly, the user data is assigned to resource elements that avoid the downlink control channel, downlink reference signals, and blank resources that interfere with downlink control channels of the pico-cell in the subframe of the macro-cell C2. For example, in the subframe #4 of the macro-cell C2, the 5th to 7th symbols interfere with the control channel of the subframe #2 of the pico-cell C1. Therefore, in the subframe #4 of the macro-cell C2, the user data is assigned to resource elements in regions that avoid the 1st to 3rd symbols, 5th to 7th symbols, downlink reference signals and the like.

The blank resources of the downlink radio frame of the macro-cell C2 are set based on the shift amount of transmission timing of downlink radio frames of the pico-cell C1 and the macro-cell C2. The shift amount indicates a shift of the downlink control channel in each subframe of the pico-cell C1 and the macro-cell C2. Therefore, in the subframe of the macro-cell C2, resources that interfere with the downlink control channel of the pico-cell C1 are specified by the shift amount. Thus, resources that interfere with the downlink radio frame of the pico-cell C1 are specified, and the resources are set as blank resources. In addition, the shift amount may be configured so that the base station apparatus 40 of the macro-cell C2 (see FIG. 7) receives signaling of the base station apparatus 20 of the pico-cell, alternatively, the reverse may be possible.

In addition, the blank resources set in the base station apparatus of the macro-cell are resources set not to interfere with the control channel of the radio frame of the pico-cell C1. In this case, the blank resources may be resources to which any data is not assigned at all, or may be defined as resources to which unnecessary data is assigned. Further, the blank resources may be defined as resources transmitted with transmission power of predetermined transmission power or less.

Further, the mobile terminal apparatus 30 of the macro-cell C2 is notified of the allocation position of the blank resources of the downlink radio frame of the macro-cell C2 as blank resource information. By this configuration, the mobile terminal apparatus 30 of the macro-cell C2 is capable of demodulating the user data while avoiding the blank resources of the downlink radio frame. In this case, the blank resource information may be notified to the mobile terminal apparatus 30 for each subframe. Further, when the blank resource information is stored in the mobile terminal apparatus 30 in association with the shift amount of transmission timing of downlink radio frames of the pico-cell C1 and the macro-cell C2, notification to the mobile terminal apparatus 30 is not necessary. This is because the mobile terminal apparatus 30 is capable of estimating the allocation position of the blank resources from the shift amount. By this configuration, the base station apparatus 40 of the macro-cell C2 notifies the mobile terminal apparatus 30 of only the shift amount, and it is possible to reduce overhead.

Figure 7:
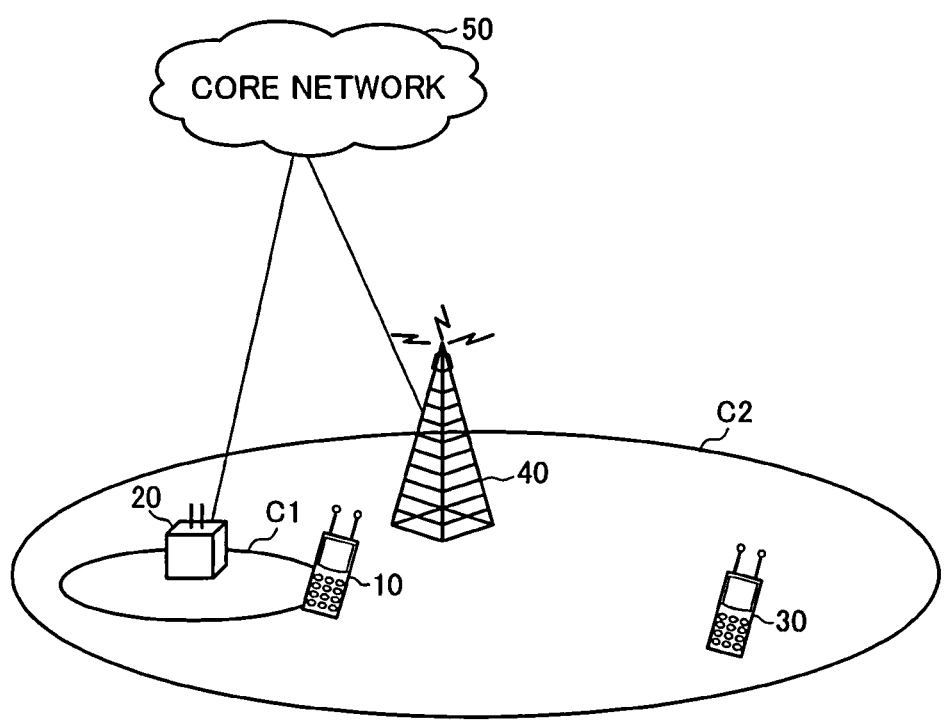
FIG. 7 is an explanatory view of a configuration of a radio communication system.

Herein, a radio communication system according to the Embodiment of the invention will be described specifically. FIG. 7 is an explanatory view of a system configuration of the radio communication system according to this Embodiment. In addition, for example, the radio communication system as shown in FIG. 7 is a system including the LTE system, or SUPER 3G. Further, the radio communication system may be called IMT-Advanced or may be called 4G.

As shown in FIG. 7, the radio communication system is the HetNet, and a hierarchical network is constructed using the first system having the macro-cell C2 and the second system having the pico-cell C1. The first system includes the base station apparatus 40 that covers the macro-cell C2, and mobile terminal apparatuses 30 (only one is shown) that communicate with the base station apparatus 40 and is comprised thereof. The second system includes the base station apparatus 20 that covers the pico-cell C1, and mobile terminal apparatuses 10 (only one is shown) that communicate with the base station apparatus 20 and is comprised thereof. In the base station apparatuses 20, 40, each scheduler allocates radio resources on a resource block basis for each user. Further, each of the base station apparatuses 20, 40 is connected to an upper station apparatus, not shown, and is connected to a core network 50 via the upper station apparatus. In addition, for convenience in description, the description is given while assuming that equipments that perform radio communication with the base station apparatuses 20, 40 are mobile terminal apparatuses, and more generally, the equipments may be user equipments (UEs) including mobile terminal apparatuses and fixed terminal apparatuses.

In the radio communication system, as a radio access scheme, OFDMA (Orthogonal Frequency Division Multiple Access) is applied in downlink, while SC-FDMA (Single-Carrier Frequency Division Multiple Access) is applied in uplink. OFDMA is a multicarrier transmission scheme for dividing a frequency band into a plurality of narrow frequency bands (subcarriers), and mapping data to each subcarrier to perform communication. SC-FDMA is a single-carrier transmission scheme for dividing the system band into bands comprised of a single or consecutive resource blocks for each terminal so that a plurality of terminals uses mutually different bands, and thereby reducing interference among the terminals.

Described herein are communication channels in the LTE system. Communication channels in downlink have the PDSCH as a downlink data channel shared among mobile terminal apparatuses, and downlink L1/L2 control channels (PDCCH, PCFICH, PHICH). User data and higher control information is transmitted on the PDSCH. Scheduling information of the PDSCH and PUSCH and others are transmitted on the PDCCH. The number of OFDM symbols used in the PDCCH is transmitted on the PCFICH (Physical Control Format Indicator Channel). ACK/NACK of HARQ (Hybrid Automatic Repeat reQuest) to the PUSCH is transmitted on the PHICH (Physical Hybrid-ARQ Indicator Channel).

Uplink communication channels have the PUSCH (Physical Uplink Shared Channel) as an uplink data channel shared among mobile terminal apparatuses, and the PUCCH (Physical Uplink Control Channel) that is an uplink control channel. User data and higher control information is transmitted on the PUSCH. Further, downlink radio quality information (CQI: Channel Quality Indicator), ACK/NACK and others are transmitted on the PUCCH.

Figure 8:
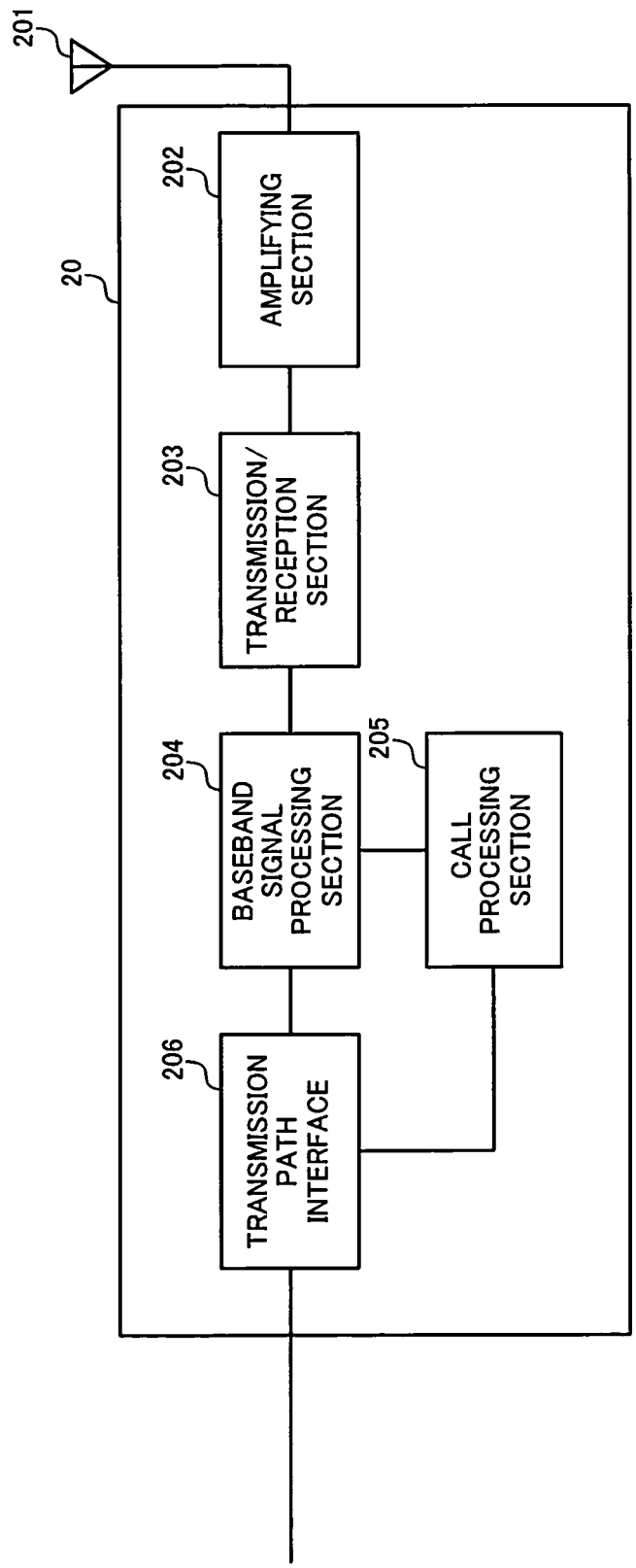
FIG. 8 is an explanatory view of the entire configuration of the base station apparatus.

Referring to FIG. 8, described next is the entire configuration of the base station apparatus that covers the pico-cell according to this Embodiment. In addition, the base station apparatus that covers the macro-cell has the same configuration as that of the base station apparatus of the pico-cell, and the description thereof is omitted herein. Further, for convenience in description, the processing of signals transmitted from the mobile terminal apparatus to the base station apparatus in uplink is omitted.

The base station apparatus 20 is provided with a transmission/reception antenna 201, amplifying section 202, transmission/reception section 203, baseband signal processing section 204, call processing section 205 and transmission path interface 206. The user data transmitted from the base station apparatus 20 to the mobile terminal apparatus 10 in downlink is input to the baseband signal processing section 204 via the transmission path interface 206 from the upper station apparatus.

The baseband signal processing section 204 performs, on a signal of the downlink data channel, PDCP layer processing, segmentation and concatenation of the user data, RLC (Radio Link Control) layer transmission processing such as transmission processing of RLC retransmission control, MAC (Medium Access Control) retransmission control e.g. transmission processing of HARQ, scheduling, transmission format selection, channel coding, Inverse Fast Fourier Transform (IFFT) processing and precoding processing. Further, with respect to a signal of the downlink control channel, the transmission processing such as channel coding and Inverse Fast Fourier Transform is also performed. Furthermore, on the broadcast channel, the baseband signal processing section 204 notifies the mobile terminal apparatuses 10 connected to the same cell C1 of control information for each mobile terminal apparatus 10 to perform radio communication with the base station apparatus 20.

The transmission/reception section 203 converts the frequency of the baseband signal output from the baseband signal processing section 204 into a radio frequency band. The amplifying section 202 amplifies the transmission signal with the frequency converted to output to the transmission/reception antenna 201.

Figure 9:
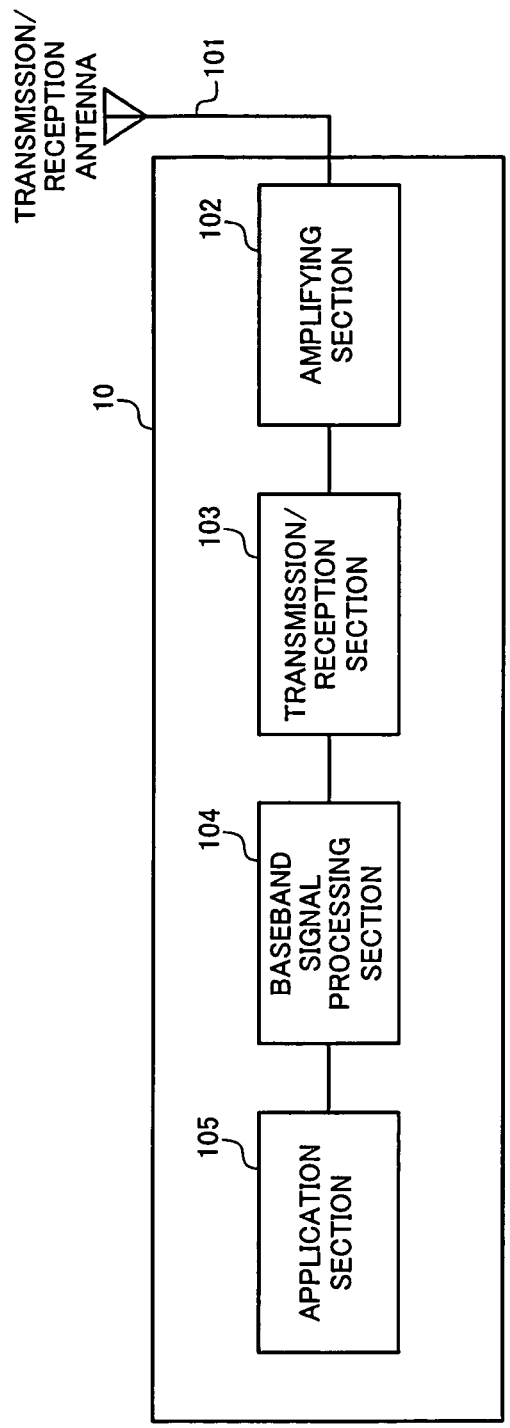
FIG. 9 is an explanatory view of the entire configuration of a mobile terminal apparatus.

Referring to FIG. 9, described next is the entire configuration of the mobile terminal apparatus located in the pico-cell according to this Embodiment. In addition, the mobile terminal apparatus located in the macro-cell has the same configuration as that of the mobile terminal apparatus located in the pico-cell, and the description thereof is omitted herein. Further, for convenience in description, the processing of signals transmitted from the mobile terminal apparatus to the base station apparatus in uplink is omitted.

The mobile terminal apparatus 10 is provided with a transmission/reception antenna 101, amplifying section 102, transmission/reception section 103, baseband signal processing section 104 and application section 105. With respect to transmission data in downlink, a radio frequency signal received in the transmission/reception antenna 101 is amplified in the amplifying section 102, subjected to frequency conversion in the transmission/reception section 103, and is converted into a baseband signal.

The baseband signal processing section 104 performs, on the baseband signal, FFT processing, error correcting decoding, reception processing of retransmission control, etc. Among the data in downlink, user data in downlink is transferred to the application section 105. The application section 105 performs processing concerning layers higher than the physical layer and MAC layer and the like. Further, among the data in downlink, broadcast information is also transferred to the application section 105.

Figure 10:
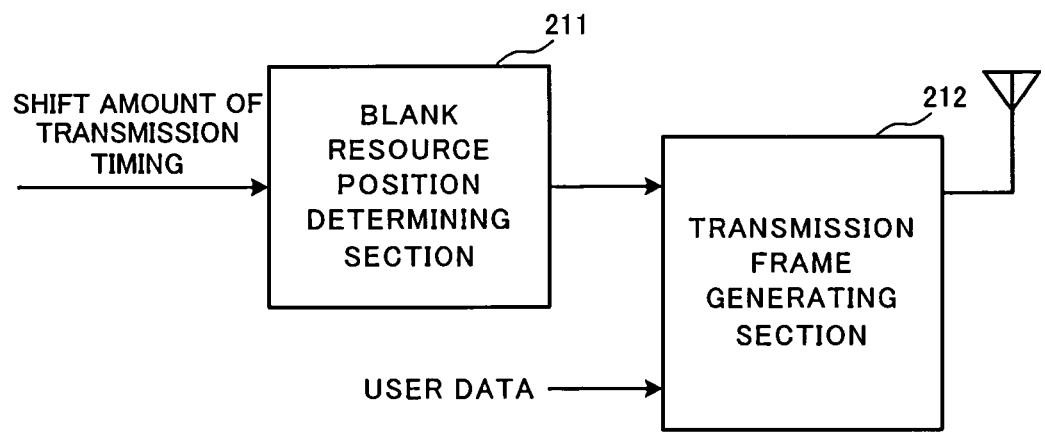
FIG. 10 is a conceptual diagram of a process of generating a downlink transmission frame in the base station apparatus of the pico-cell.

Referring to FIG. 10, described is a process of generating a downlink transmission frame in the base station apparatus that covers the pico-cell. FIG. 10 is a conceptual diagram of the process of generating a downlink transmission frame in the base station apparatus that covers the pico-cell according to this Embodiment.

As shown in FIG. 10, the process of generating a transmission frame has a blank resource position determining section 211 and a transmission frame generating section 212. The blank resource position determining section 211 determines an allocation position of blank resources, based on the set position of the blank period notified from the base station apparatus 40 of the macro-cell C2 and the shift amount as described above. In this case, the blank resource position determining section 211 identifies a subframe of which the downlink control channel does not undergo interference by the shift amount and the set position of the blank period. Further, in the subframe, the blank resource position determining section 211 identifies the resource position that undergoes interference from the downlink control channel and downlink data channel of the downlink transmission frame of the macro-cell C2, and determines the allocation position of blank resources. Thus, resources in which the downlink transmission frame of the macro-cell C2 undergoes interference are set as blank resources.

Next, the transmission frame generating section 212 arranges user data while avoiding downlink control channels, downlink reference signals, blank resources, etc. based on the allocation position of the blank resources, and applies the other transmission processing to generate a downlink transmission frame.

Figure 11:
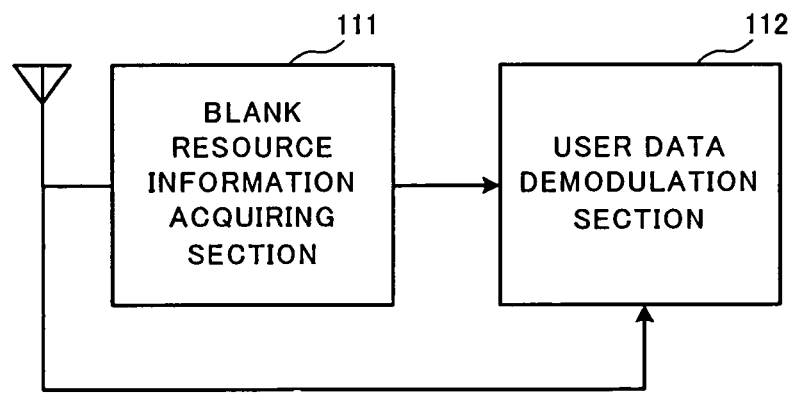
FIG. 11 is a conceptual diagram of a process of receiving the downlink transmission frame in the mobile terminal apparatus that communicates via the pico-cell.

Referring to FIG. 11, described is a process of receiving the downlink transmission frame in the mobile terminal apparatus that communicates via the pico-cell. FIG. 11 is a conceptual diagram of the process of receiving the downlink transmission frame in the mobile terminal apparatus that communicates via the pico-cell according to this Embodiment.

As shown in FIG. 11, the process of receiving the transmission frame has a blank resource information acquiring section 111, and a user data demodulation section 112. The blank resource information acquiring section 111 acquires the blank resource information indicative of the allocation position of the blank resources from the base station apparatus 20. The blank resource information may be information that directly indicates the allocation position of the blank resources, or may be the shift amount of downlink radio frames of the pico-cell C1 and the macro-cell C2 as described above. Further, the mobile terminal apparatus 10 may acquire the blank resource information for each subframe.

The user data demodulation section 112 demodulates the user data from the transmission frame based on the blank resource information. In this case, the user data demodulation section 112 demodulates the user data, while ignoring resources indicated by the blank resource information.

Thus, the base station apparatus 20 of the pico-cell C1 assigns the user data to subframes while avoiding resources that undergo interference from the downlink radio frame of the macro-cell C2. Therefore, in the downlink transmission frame of the pico-cell C1, interference to downlink data channels is suppressed in subframes with interference to downlink control channels from the macro-cell C2 suppressed.

Figure 12:
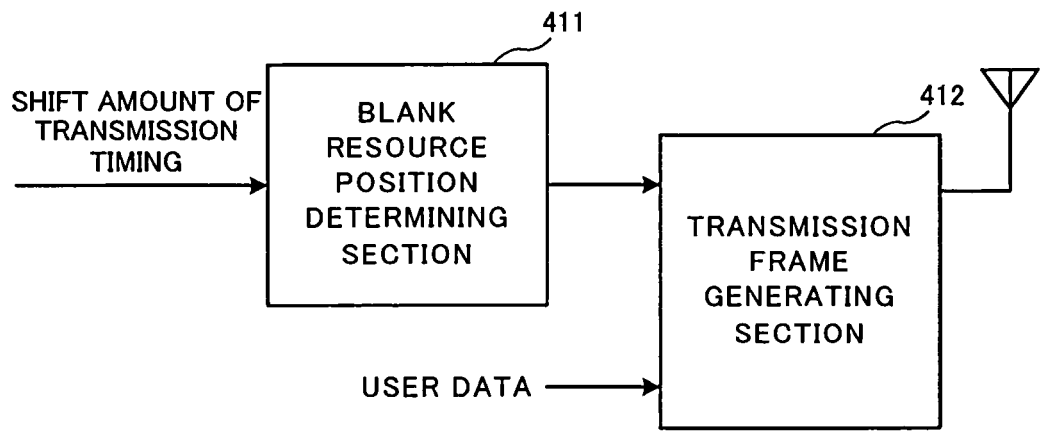
FIG. 12 is a conceptual diagram of a process of generating a downlink transmission frame in the base station apparatus of the macro-cell.

Referring to FIG. 12, described is a process of generating a downlink transmission frame in the base station apparatus that covers the macro-cell. FIG. 12 is a conceptual diagram of the process of generating a downlink transmission frame in the base station apparatus that covers the macro-cell according to this Embodiment.

As shown in FIG. 12, the process of generating a transmission frame has a blank resource position determining section 411 and a transmission frame generating section 412. The blank resource position determining section 411 determines an allocation position of blank resources, based on the shift amount of radio frames in the macro-cell C2 and the pico-cell C1. In this case, the blank resource position determining section 411 identifies a resource position that interferes with the downlink control channel of the downlink radio frame of the pico-cell C1 by the shift amount, and determines the allocation position of blank resources. Thus, resources that interfere with the control channel of the transmission frame of the pico-cell C1 are set as blank resources.

Next, the transmission frame generating section 412 arranges user data while avoiding downlink control channels, downlink reference signals, blank resources, etc. based on the allocation position of the blank resources, and applies the other transmission processing to generate a downlink transmission frame.

Figure 13:
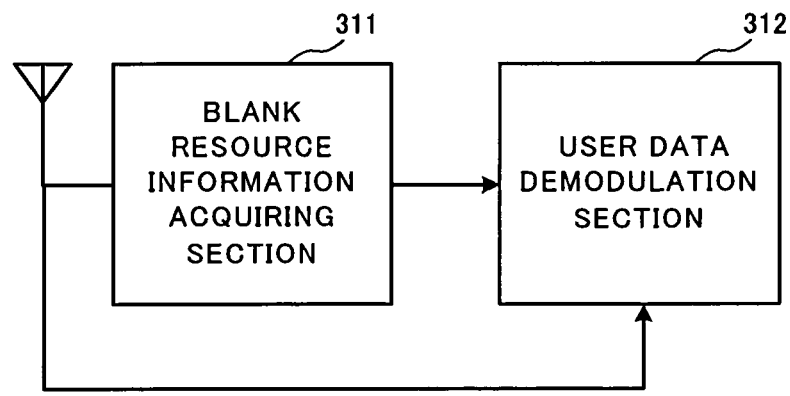
FIG. 13 is a conceptual diagram of a process of receiving the downlink transmission frame in the mobile terminal apparatus that communicates via the macro-cell.

Referring to FIG. 13, described is a process of receiving the downlink transmission frame in the mobile terminal apparatus that communicates via the macro-cell. FIG. 13 is a conceptual diagram of the process of receiving the downlink transmission frame in the mobile terminal apparatus that communicates via the macro-cell according to this Embodiment.

As shown in FIG. 13, the process of receiving the transmission frame has a blank resource information acquiring section 311, and a user data demodulation section 312. The blank resource information acquiring section 311 acquires the blank resource information indicative of the allocation position of the blank resources from the base station apparatus 40. The blank resource information may be information that directly indicates the allocation position of the blank resources, or may be the shift amount of downlink radio frames of the pico-cell C1 and the macro-cell C2 as described above. Further, the mobile terminal apparatus 30 may acquire the blank resource information for each subframe.

The user data demodulation section 312 demodulates the user data from the transmission frame based on the blank resource information. In this case, the user data demodulation section 312 demodulates the user data, while ignoring resources indicated by the blank resource information.

Thus, the base station apparatus 40 of the macro-cell C2 assigns the user data to subframes while avoiding resources that interfere with the control channel of the downlink radio frame of the pico-cell C1. Therefore, in the downlink transmission frame of the pico-cell C1, interference to the downlink control channel from the macro-cell C2 is suppressed.

As described above, according to the base station apparatuses 20, 40 according to this Embodiment, interference is suppressed which a downlink transmission frame transmitted from the base station apparatus of the pico-cell undergoes from a downlink transmission frame transmitted from the base station apparatus of the macro-cell. In other words, interference of data channels is suppressed in subframes with interference of control channels of the pico-cell C1 suppressed by MBSFN subframes of the downlink transmission frame of the macro-cell C2. Further, in subframes except the MBSFN subframes of the downlink transmission frame of the macro-cell C2, interference to control channels of the downlink transmission frame of the pico-cell is suppressed. Accordingly, interference to the downlink transmission frame of the pico-cell is sufficiently suppressed. Thus, it is possible to cause the base station apparatuses 20, 40 to perform control adapted to interference inside the Heterogeneous network having the macro-cell C2 and the pico-cell C1.

In addition, the aforementioned Embodiment describes the base station apparatus that covers the pico-cell as a small-scale cell, but the invention is not limited to this configuration. It is essential only that the base station apparatus covers a cell that undergoes interference from the macro-cell, and the base station apparatus may be small-sized base station apparatuses that cover a femto-cell, micro-cell and the like.

Further, in the above-mentioned Embodiment, the blank period indicates a period during which the radio frame of the pico-cell is not affected by interference from the radio frame of the macro-cell. In the radio frame of the macro-cell, the blank period may be a period during which no data is transmitted, or may be defined as a period during which data is transmitted to the extent that does not affect interference. Further, in the radio frame of the macro-cell, the blank period may be defined as a period during which transmission is performed with transmission power of the extent that does not have any effect of interference on the radio frame of the pico-cell. Furthermore, in the radio frame of the macro-cell, the blank period may be defined as a period during which transmission is performed with an interfering amount of the extent that does not affect the radio frame of the pico-cell.

The present invention is not limited to the above-mentioned Embodiment, and is capable of being carried into practice with various modifications thereof. For example, without departing from the scope of the invention, assignment of component carriers, the number of processing sections, processing procedures, the number of component carriers, and the number of aggregated component carriers in the above-mentioned description are capable of being carried into practice with modifications thereof as appropriate. Further, the invention is capable of being carried into practice with modifications thereof as appropriate without departing from the scope of the invention.

The present application is based on Japanese Patent Application No. 2010-087389 filed on Apr. 5, 2010, entire content of which is expressly incorporated by reference herein.

The invention claimed is:

1. A base station apparatus which shares at least a part of a frequency band with another base station apparatus that covers a small-scale cell, covers a large-scale cell, and is capable of transmitting a downlink transmission frame at transmission timing different from the another base station apparatus, comprising:

a blank resource setting section configured to, when the downlink transmission frame includes a Multimedia Broadcast multicast service Single Frequency Network (MBSFN) subframe in which a blank period is set except for a downlink control channel and a reference signal and the downlink transmission frame is subframe-shifted in a time-axis direction relative to another downlink transmission frame of the another base station apparatus to make the blank period of the MBSFN subframe coincident with a downlink control channel of the another downlink transmission frame, set radio resources in a subframe other than the MBSFN subframe in the downlink transmission frame as blank resources, the radio resources interfering with the downlink control channel of the another downlink transmission frame;

a user data assigning section configured to assign user data to the downlink transmission frame while avoiding the blank resources; and a transmission section configured to transmit the downlink transmission frame assigned with the user data to a mobile terminal apparatus, wherein the blank resources of the downlink radio frame of the large-scale cell are set based on a shift amount of transmission timing of downlink radio frames of the small-scale cell and the large-scale cell.

2. A mobile terminal apparatus connected to a base station apparatus which shares at least a part of a frequency band with another base station apparatus that covers a small-scale cell, covers a large-scale cell, and is capable of transmitting a downlink transmission frame at transmission timing different from the another base station apparatus, comprising:

a blank resource information acquiring section configured to, when the downlink transmission frame includes a Multimedia Broadcast multicast service Single Frequency Network (MBSFN) subframe in which a blank period is set except for a downlink control channel and a reference signal and the downlink transmission frame is subframe-shifted in a time-axis direction relative to another downlink transmission frame of the another base station apparatus to make the blank period of the MBSFN subframe coincident with a downlink control channel of the another downlink transmission frame, acquire blank resource information to identify radio resources in a subframe other than the MBSFN subframe in the downlink transmission frame as blank resources set in the base station apparatus, the radio resources interfering with the downlink control channel of the another downlink transmission frame; and a user data demodulation section configured to demodulate user data received from the base station apparatus while avoiding the blank resources, based on the blank resource information, wherein the blank resources of the downlink radio frame of the large-scale cell are set based on a shift amount of transmission timing of downlink radio frames of the small-scale cell and the large-scale cell.

3. The mobile terminal apparatus according to claim 2, wherein the blank resource information is a shift amount of transmission timing of the downlink transmission frame with respect to the another downlink transmission frame acquired from the base station apparatus.

4. A communication control method in a base station apparatus which shares at least a part of a frequency band with another base station apparatus that covers a small-scale cell, covers a large-scale cell, and is capable of transmitting a downlink transmission frame at transmission timing different from the another base station apparatus, comprising:

when the downlink transmission frame includes a Multimedia Broadcast multicast service Single Frequency Network (MBSFN) subframe in which a blank period is set except for a downlink control channel and a reference signal and the downlink transmission frame is subframe-shifted in a time-axis direction relative to another downlink transmission frame of the another base station apparatus to make the blank period of the MBSFN subframe coincident with a downlink control channel of the another downlink transmission frame, setting radio resources in a subframe other than the MBSFN subframe in the downlink transmission frame as blank resources, the radio resources interfering with the downlink control channel of the another downlink transmission frame;

assigning user data to the downlink transmission frame while avoiding the blank resources; and transmitting the downlink transmission frame assigned with the user data to a mobile terminal apparatus, wherein the blank resources of the downlink radio frame of the large-scale cell are set based on a shift amount of transmission timing of downlink radio frames of the small-scale cell and the large-scale cell.

\* \* \* \* \*